US009790292B2

(12) United States Patent
Kim et al.

(10) Patent No.: US 9,790,292 B2
(45) Date of Patent: Oct. 17, 2017

(54) METHOD OF PURIFYING POLYOLEFIN

(71) Applicant: LOTTE CHEMICAL CORPORATION, Seoul (KR)

(72) Inventors: Sinyoung Kim, Daejeon (KR); Seong Soo Lim, Daejeon (KR); Suran Lee, Daejeon (KR); Jaeho Kim, Daejeon (KR); Sang Hong Shin, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/038,099

(22) PCT Filed: Oct. 23, 2014

(86) PCT No.: PCT/KR2014/010024
§ 371 (c)(1),
(2) Date: May 20, 2016

(87) PCT Pub. No.: WO2015/080381
PCT Pub. Date: Jun. 4, 2015

(65) Prior Publication Data
US 2016/0289347 A1    Oct. 6, 2016

(30) Foreign Application Priority Data
Nov. 29, 2013   (KR) .................. 10-2013-0147854

(51) Int. Cl.
C08J 11/02       (2006.01)
C08F 6/00        (2006.01)
C08C 4/00        (2006.01)

(52) U.S. Cl.
CPC ............... *C08F 6/005* (2013.01); *C08C 4/00* (2013.01); *C08J 11/02* (2013.01); *C08J 2323/08* (2013.01); *C08J 2323/20* (2013.01); *Y02P 20/582* (2015.11)

(58) Field of Classification Search
None
See application file for complete search history.

(56) References Cited

U.S. PATENT DOCUMENTS 4,372,758 A    2/1983  Bobst et al.
5,376,742 A   12/1994  Krause
(Continued)

FOREIGN PATENT DOCUMENTS

CN   101501079   8/2009
CN   103298842   9/2013
JP   57-076006   5/1982
(Continued)

OTHER PUBLICATIONS

PCT Search Report & Written Opinion, Patent Cooperation Treaty, Dec. 15, 2014, Application No. PCT/KR2014/010024.
(Continued)

*Primary Examiner* — Richard A Huhn
(74) *Attorney, Agent, or Firm* — Lex IP Meister, PLLC

(57) ABSTRACT

Provided is a method of purifying polyolefin, the method including the step of contacting linear low-density polyethylene synthesized by a gas phase polymerization reaction with a purge gas containing an ethylene gas and an inert gas in a purge bin. According to this purification method, residual alkene monomers with high carbon numbers may be removed in a simpler and more efficient manner.

9 Claims, 1 Drawing Sheet

(56) References Cited

U.S. PATENT DOCUMENTS

| | | | |
|---|---|---|---|
| 5,521,264 A | 5/1996 | Mehra | |
| 2013/0291720 A1* | 11/2013 | Blood | B01D 53/002 95/39 |

FOREIGN PATENT DOCUMENTS

| | | |
|---|---|---|
| JP | 60-079017 | 5/1985 |
| JP | 04-039305 | 2/1992 |
| JP | 07-206296 | 8/1995 |
| JP | 2004-204028 | 7/2004 |
| KR | 10-2006-0009850 | 2/2006 |
| KR | 10-2010-0086504 | 7/2010 |
| KR | 10-2011-0084161 | 7/2011 |
| KR | 10-1197501 | 11/2012 |
| WO | 9818548 | 5/1998 |

OTHER PUBLICATIONS

European Patent Office, European Search Report of Application No. 14866065. 7., dated May 30, 2017.

* cited by examiner

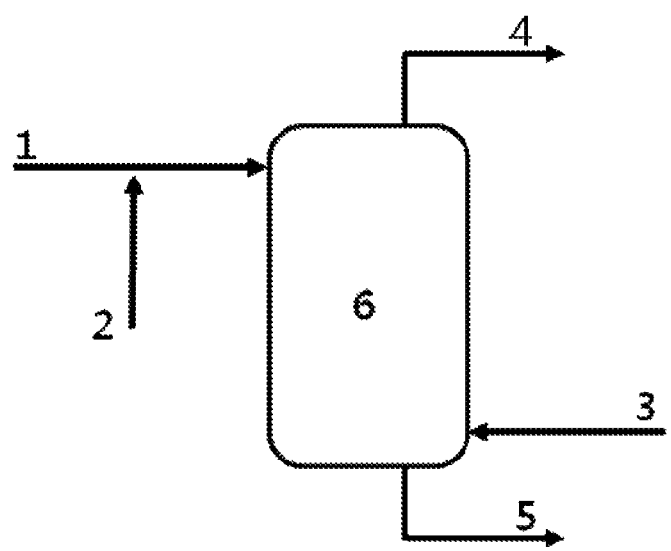

METHOD OF PURIFYING POLYOLEFIN

TECHNICAL FIELD

The present invention relates to a method of purifying polyolefin, and more particularly, to a method of purifying polyolefin, which is used to remove residual alkene monomers with high carbon numbers in a simpler and more efficient manner.

BACKGROUND OF ART

With development of metallocene catalysts with excellent catalytic activity and selectivity, industrial-scale processes of preparing polyolefin by polymerizing olefin in the presence of a solid catalyst in a gas medium are widely used. In this gas-phase polymerization process, olefin may be polymerized by mechanically stirring a reaction bed (stirred bed reactor) or by continuously circulating a reaction gas to fluidize the reaction bed in a suspension state (fluidized bed reactor) in order to maintain a polymer bed through which the reaction gas flows.

The polyolefin prepared by the gas-phase polymerization process may include a large amount of residual monomers, and these monomers may cause explosion during a processing step of products and may be mixed with final products to deteriorate properties of the products or to produce defective products. Therefore, the monomers must be removed from the final products.

Previously, to remove residual monomers from polyolefin prepared by the gas-phase polymerization process, the polyolefin was purged with nitrogen gas as a purge gas to vaporize residual monomers, which were then separated from the polyolefin, as in Korean Patent Publication No. 2011-0084161.

When monomers having 4 or less carbon atoms are mainly used in the gas-phase polymerization process, residual monomers can be separated only by the step of purging with nitrogen gas as in the above-described patent. However, when alkenes having 5 or more carbon atoms are used as monomers, there is a limitation that alkenes having 5 or more carbon atoms cannot be removed only by the step of purging with nitrogen gas, because of high boiling point of the monomers.

Accordingly, there is a need to develop a method of purifying polyolefin, which is applicable to the gas phase polymerization process using alkene monomers with high carbon numbers and is used to remove residual monomers in a simpler manner.

PRIOR ART DOCUMENTS

Patent Documents (Patent Document 0001) Korean Patent Publication No. 2011-0084161

DETAILED DESCRIPTION OF THE INVENTION

Technical Problem

The present invention provides a method of purifying polyolefin, which is used to remove residual alkene monomers with high carbon numbers in a simpler and more efficient manner.

Technical Solution

The present invention provides a method of purifying polyolefin, the method including the step of contacting linear low-density polyethylene synthesized by a gas phase polymerization reaction with a purge gas containing an ethylene gas and an inert gas in a purge bin.

Hereinafter, a method of purifying polyolefin according to a specific embodiment of the present invention will be described in more detail.

According to an embodiment, provided is a method of purifying polyolefin, the method including the step of contacting linear low-density polyethylene synthesized by a gas phase polymerization reaction with a purge gas containing an ethylene gas and an inert gas in a purge bin.

The present inventors recognized that when gas-phase or liquid-phase monomers remain in polyolefin, in particular, linear low-density polyethylene prepared by the gas phase polymerization reaction, the monomers may cause explosion during a processing step of products and may be mixed with final products to deteriorate properties of the products or to produce defective products, and thus a method of purifying polyolefin capable of removing residual monomers is important, leading to this study.

Accordingly, the present inventors conducted an experiment to confirm that a simple method of contacting linear low-density polyethylene synthesized by a gas phase polymerization reaction with a purge gas containing an ethylene gas and an inert gas in a purge bin may be used to vaporize and remove residual monomers, thereby completing the present invention.

Particularly, in the method of purifying polyolefin of an embodiment, only the inert gas such as nitrogen is not used as a purge gas, but the inert gas is used together with the ethylene gas in the purge bin, thereby vaporizing and removing alkenes having 5 or more carbon atoms and a high boiling point, among residual monomers. The ethylene gas used as the purge gas is also recycled as a reactant in the gas phase polymerization process of linear low-density polyethylene, thereby increasing efficiency and economy of the process.

The linear low-density polyethylene may exist as a final pure linear low-density polyethylene product, but may also coexist with monomers that remain in the gas phase polymerization process of linear low-density polyethylene. These residual monomers in a gas or liquid phase may cause explosion during a processing step of products and may be mixed with the final products to deteriorate properties of the products, and therefore, the monomers must be removed.

As used herein, the pure linear low-density polyethylene, which is a linear low-density polyethylene separated through a purification process, refers to a compound including 99.9% or more of the linear low-density polyethylene or a compound being substantially composed of only the linear low-density polyethylene.

The linear low-density polyethylene may include one or more residual monomers selected from the group consisting of ethylene, 1-pentene, 1-hexene, 1-heptene, 1-octene, 1-nonene, 1-decene, 1-undecene, and 1-dodecene. The residual monomers mean all compounds that remain after the gas phase polymerization reaction, among monomers used as reactants in the gas phase polymerization reaction of linear low-density polyethylene.

Otherwise, the linear low-density polyethylene may include ethylene and 1-octene. The ethylene and 1-octene are reactant monomers used in the preparation of linear low-density polyethylene, and the ethylene and 1-octene may be mixed in the gas or liquid phase with the linear low-density polyethylene.

The residual monomers may be included in an amount of 0.01 to 5% by weight, based on the total weight of the linear low-density polyethylene.

Further, the linear low-density polyethylene may be formed by the gas phase polymerization reaction of ethylene and alkene having 3 to 10 carbon atoms. The linear low-density polyethylene may be formed by using ethylene and alkene having 3 to 10 carbon atoms as reactants and by applying, without limitation, a device such as a stirred bed reactor, a fluidized bed reactor, etc. and a method for gas phase polymerization, the device and the method being known to be generally used in the preparation of linear low-density polyethylene.

The linear low-density polyethylene may have a density of 0.500 to 1.000 g/ml, and preferably, 0.900 to 0.940 g/ml.

The linear low-density polyethylene may have a melt index of 0.1 to 100 g/10 min, and preferably, 0.5 to 50 g/10 min, as measured in accordance with ASTM D1238.

In the method of purifying polyolefin of an embodiment, the purge gas means all of a gas provided for purging and a carrier gas used for providing the polyolefin prepared by the gas phase polymerization reaction for the purge bin.

The purge gas may include an inert gas not participating in the polymerization reaction and a gas for removing activity of a polymerization catalyst, and the purge gas may continuously ventilate residual monomers included in the linear low-density polyethylene inside the purge bin to remove them from the purge bin, thereby reducing a vapor pressure of the residual monomers below a saturated vapor pressure, leading to vaporization of the residual monomers.

The purge gas may include the ethylene gas and the inert gas. Specific examples of the inert gas may include helium, neon, argon, krypton, xenon, radon, nitrogen gas, etc., and nitrogen gas is preferred for easier reaction and reaction stability.

Further, the purge gas may further include high-temperature water vapor, carbon monoxide, etc., in addition to the ethylene gas and inert gas. The ethylene gas and inert gas may be injected into the purge bin, individually or in mixed form. Particularly, the ethylene gas may be used as a carrier gas for providing the purge bin with the polyolefin prepared by the gas phase polymerization reaction, optionally, together with nitrogen gas.

In particular, since the ethylene gas has a characteristic that it is mixed with alkene having 5 or more carbon atoms to increase the saturated vapor pressure of the alkene having 5 or more carbon atoms, thereby decreasing a boiling point of the alkene having 5 or more carbon atoms, it is possible to vaporize alkene having 5 or more carbon atoms, of which vaporization and separation have been difficult when only the inert gas is used as the purge gas.

In the pure gas, a volume ratio of the ethylene gas and the inert gas may be 1:99 to 70:30, and preferably, 5:95 to 50:50. When the ethylene gas is injected into the purge bin within the above range of the volume ratio of the ethylene gas with respect to the nitrogen gas, residual alkene monomers with high carbon numbers may be separated by vaporization.

The purge gas may be injected into the purge bin via a high-pressure feed line. When the purge gas is injected into the purge bin by using the line, the purge gas may uniformly contact linear low-density polyethylene accumulated inside the purge bin, thereby vaporizing residual monomers more efficiently.

The purge gas may be at a temperature of 25 to 100° C., and preferably, 60 to 100° C. The temperature of the purge gas is associated with vaporization of alkenes with high carbon numbers and the state of linear low-density polyethylene. Therefore, if the temperature is lower than 25° C., alkenes with high carbon numbers may be not vaporized and thus may remain in linear low-density polyethylene even after the purification process. If the temperature is higher than 100° C., linear low-density polyethylene inside the purge bin may be in a melt state, and thus its commercial value may be reduced.

The purge gas may have a pressure of 1 to 50 kgf/cm$^2$, and preferably, 5 to 35 kgf/cm$^2$. The pressure of the purge gas is associated with ventilation of the purge gas and vaporization of residual monomers. Therefore, if the pressure is lower than 1 kgf/cm$^2$, ventilation of the purge gas may not occur properly. If the pressure is higher than 50 kgf/cm$^2$, the saturated vapor pressure is lowered, and thus residual monomers may not be vaporized.

Meanwhile, in the method of purifying polyolefin, the step of contacting linear low-density polyethylene with the purge gas may be performed for 10 minutes to 12 hours. In other words, after the linear low-density polyethylene and the purge gas are introduced into the purge bin, they may contact and react with each other for 10 minutes to 12 hours. If the contacting time is too short, some of the residual monomers may not be vaporized and may remain in a liquid state.

The step of contacting the linear low-density polyethylene with the purge gas may be performed at a temperature of 25 to 100° C. Since the contacting temperature is associated with the saturated vapor pressure of residual monomers, vaporization of alkenes with high carbon numbers and state of the linear low-density polyethylene may differ depending on the temperature. If the contacting temperature is lower than 25° C., the saturated vapor pressure inside the purge bin may be too low. In this case, even though residual monomers are continuously ventilated by the purge gas to be removed from the purge bin, the vapor pressure of residual monomers do not decrease below the saturated vapor pressure, and therefore, alkenes with high carbon numbers may not be vaporized. Further, if the contacting temperature is higher than 100° C., linear low-density polyethylene inside the purge bin may be in a melt state, and thus its commercial value may be reduced.

The step of contacting the linear low-density polyethylene with the purge gas may be performed at a pressure of 1 to 50 kgf/cm$^2$. The contacting pressure is associated with ventilation of the purge gas and vaporization of residual monomers. Therefore, if the pressure is lower than 1 kgf/cm$^2$, ventilation of the purge gas may not occur properly. If the pressure is higher than 50 kgf/cm$^2$, the saturated vapor pressure is lowered, and thus residual monomers may not be vaporized.

The purge bin means a space or construct, in which the linear low-density polyethylene prepared by the gas phase polymerization reaction is allowed to contact the purge gas including the ethylene gas and the inert gas. Specifically, the purge bin has a configuration consisting of a purge gas feed line, a linear low-density polyethylene/carrier gas feed line, a ventilation line, and a pure linear low-density polyethylene discharge line, and these respective components may function to provide the purge gas, to provide the linear low-density polyethylene containing residual monomers and the carrier gas, to transfer the residual monomers separated by vaporization and the carrier gas and the purge gas to a purification device for recycling, and to transfer linear low-density polyethylene, from which the residual monomers are removed, to a granulation process for commercialization.

Meanwhile, the method of purifying polyolefin may further include the step of separating a gas which is produced by contacting the linear low-density polyethylene with the purge gas. As described above, residual monomers included in the linear low-density polyethylene may be vaporized by contacting the linear low-density polyethylene with the purge gas containing the ethylene gas and the inert gas, and the vaporized residual monomer and the purge gas may be separated by a separate purification process of cooling and compression. Further, the separated residual monomers and the ethylene gas may be recycled by re-injecting into the gas phase polymerization reactor for the preparation of linear low-density polyethylene.

FIG. 1 is a schematic illustration of the purge bin of an embodiment of the present invention.

As illustrated in FIG. 1, the purge bin 6 of an embodiment includes a transfer line 1 for transferring the linear low-density polyethylene including the residual monomers and the carrier gas to the purge bin, a feed line 2 for additionally feeding a gas to the carrier gas, a feed line 3 for feeding the purge gas, a discharge line 4 for discharging the purge gas, the carrier gas, and the vaporized residual monomers, and a discharge line 5 for discharging pure linear low-density polyethylene product.

Advantageous Effects

According to the present invention, provided is a method of purifying polyolefin, which is used to remove residual alkene monomers with high carbon numbers in a simpler and more efficient manner.

BRIEF DESCRIPTION OF DRAWINGS

FIG. 1 is a schematic illustration of a purge bin for a method of purifying polyolefin of an embodiment.

DETAILED DESCRIPTION OF THE EMBODIMENTS

Hereinafter, the present invention will be described in more detail with reference to the following Examples. However, the following Examples are for illustrative purposes only, and the invention is not intended to be limited by these Examples.

Examples 1 to 3

Residual monomers in linear low density polyolefin, which were introduced into a purge bin, were determined as ethylene (C2) and 1-octene (C8), and an ethylene gas and a nitrogen gas were injected as a carrier gas and a purge gas, and then the monomers and gases were mixed and maintained. Then, it was examined whether the residual monomers were vaporized and separated from products. As a computer simulation, an Aspen Plus simulation program was used. Temperature and pressure, and feed amounts of individual components specified by the computer simulation are given in the following Table 1. The computer simulation results under respective conditions are given in the following Table 1.

Comparative Example 1

A computer simulation was performed under the same computer simulation conditions as in Example 1, except that ethylene gas was not introduced as a carrier gas and a purge gas, and the results are given in the following Table 1.

Comparative Example 2

A computer simulation was performed under the same computer simulation conditions as in Example 2, except that ethylene gas was not introduced as a carrier gas and a purge gas, and the results are given in the following Table 1.

Comparative Example 3

A computer simulation was performed under the same computer simulation conditions as in Example 3, except that ethylene gas was not introduced as a carrier gas and a purge gas, and the results are given in the following Table 1.

TABLE 1

| Section | | | Example 1 | Example 2 | Example 3 | Comparative Example 1 | Comparative Example 2 | Comparative Example 3 |
|---|---|---|---|---|---|---|---|---|
| Temperature (° C.) | | | 85 | 95 | 60 | 85 | 95 | 60 |
| Pressure (kgf/cm$^2$) | | | 22 | 35 | 5 | 22 | 35 | 5 |
| Feeding | 1 | Ethylene (kg/hr) | 3.0 | 13.9 | 13.9 | 3.0 | 13.9 | 13.9 |
| | | 1-Octene (kg/hr) | 5.0 | 2.4 | 2.9 | 5.0 | 2.4 | 2.9 |
| | 2 | Ethylene (kg/hr) | 40 | 19.2 | 2 | — | — | — |
| | | Nitrogen (kg/hr) | 50.0 | 19.2 | 19.2 | 50.0 | 19.2 | 19.2 |
| Discharging | 3 | Ethylene (kg/hr) | 43.0 | 33.1 | 15.9 | 3.0 | 13.9 | 13.9 |
| | | 1-Octene (kg/hr) | 5.0 | 2.4 | 2.9 | 3.0 | 1.6 | 2.8 |
| | | Nitrogen (kg/hr) | 50.0 | 19.2 | 19.2 | 50.0 | 19.2 | 19.2 |
| | 4 | Ethylene (kg/hr) | — | — | — | Less than 0.1% | About 0.1% | Less than 0.1% |
| | | 1-Octene (kg/hr) | — | — | — | 2.0 | 0.8 | 0.1 |
| | | Nitrogen (kg/hr) | — | — | — | Less than 0.1% | Less than 0.1% | Less than 0.1% |

A feed line and a discharge line of 1 to 4 in Table 1 are as follows:
1. Residual monomers discharged from the reactor
2. Nitrogen gas and ethylene gas for transferring and purging
3. Vaporized monomers separated from products and inert gas
4. Liquid-state monomers remaining in products and inert gas As shown in Table 1, the computer simulation results of Example 1 show that all of the monomers introduced as reactants were vaporized and separated, but the results of Comparative Example 1 show that some of 1-octene passed through the purge bin remained in a liquid state, indicating incomplete separation of the monomers from the products, even though there is no difference except that no ethylene was introduced, compared to corresponding Example.

According to the results, the same phenomenon was also observed, when Examples 2 and 3 performed in the same structure as in Example 1 but under different conditions of temperature, pressure, and composition of introduced monomers were compared to corresponding Comparative Examples 2 and 3, suggesting that the ethylene gas as well as nitrogen gas may be additionally used as the carrier gas and the purge gas to vaporize and separate alkene monomers with high carbon numbers, such as 1-octene.

The invention claimed is:

1. A method of purifying polyolefin, the method comprising the step of contacting a linear low-density polyethylene including residual monomers with a purge gas containing an ethylene gas and an inert gas in a purge bin,
wherein the linear low-density polyethylene is synthesized by a gas phase polymerization reaction,
wherein the amount of the residual monomers is 0.01 to 5% by weight based on the total weight of the linear low-density polyethylene,
wherein the residual monomers include ethylene and 1-octene, and
wherein the step of contacting the linear low-density polyethylene with the purge gas is performed at a temperature of 25 to 100° C. and a pressure of 1 to 50 kgf/cm$^2$.

2. The method of claim 1, wherein the linear low-density polyethylene is formed by a gas phase polymerization reaction of ethylene and alkene having 3 to 10 carbon atoms.

3. The method of claim 1, wherein the linear low-density polyethylene has a density of 0.500 to 1.000 g/ml.

4. The method of claim 1, wherein the linear low-density polyethylene has a melt index of 0.1 to 100 g/10 min.

5. The method of claim 1, wherein a volume ratio of the ethylene gas and the inert gas in the purge gas is 1:99 to 70:30.

6. The method of claim 1, wherein the purge gas has a temperature of 25 to 100° C.

7. The method of claim 1, wherein the purge gas has a pressure of 1 to 50 kgf/cm2.

8. The method of claim 1, wherein the step of contacting the linear low-density polyethylene with the purge gas is performed for 10 minutes to 12 hours.

9. The method of claim 1, further comprising the step of separating a gas which is produced by contacting the linear low-density polyethylene with the purge gas.

* * * * *